United States Patent
Hendrie

(10) Patent No.: US 10,616,094 B2
(45) Date of Patent: Apr. 7, 2020

(54) REDIRECTING FLOW CONTROL PACKETS

(71) Applicant: Trend Micro Incorporated, Shibuya-ku (JP)

(72) Inventor: Piers E. Hendrie, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 128 days.

(21) Appl. No.: 15/949,882

(22) Filed: Apr. 10, 2018

(65) Prior Publication Data
US 2018/0234334 A1    Aug. 16, 2018

Related U.S. Application Data

(63) Continuation of application No. PCT/US2015/060518, filed on Nov. 13, 2015.

(51) Int. Cl.
*H04L 29/06* (2006.01)
*H04L 12/707* (2013.01)
*H04L 12/801* (2013.01)

(52) U.S. Cl.
CPC ............ *H04L 45/22* (2013.01); *H04L 47/115* (2013.01); *H04L 63/0227* (2013.01); *H04L 63/1408* (2013.01); *H04L 63/1416* (2013.01); *H04L 63/1441* (2013.01); *H04L 47/10* (2013.01)

(58) Field of Classification Search
CPC ......... H04L 63/10; H04L 63/12; H04L 63/14; H04L 63/1408; H04L 63/1425; H04L 63/1433; H04L 63/1441; H04L 63/145; H04L 63/1491
See application file for complete search history.

(56) References Cited

U.S. PATENT DOCUMENTS

| | | |
|---|---|---|
| 2003/0004689 A1 | 1/2003 | Gupta et al. |
| 2003/0074388 A1 | 4/2003 | Duc et al. |
| 2005/0044422 A1* | 2/2005 | Cantrell .................. H04L 43/00 726/4 |
| 2006/0120289 A1* | 6/2006 | Cunningham .......... H04L 47/10 370/235 |
| 2006/0165049 A1 | 7/2006 | Bou-Diab et al. |
| 2014/0169173 A1 | 6/2014 | Naouri et al. |

FOREIGN PATENT DOCUMENTS

CN        101997772 A    3/2011

* cited by examiner

*Primary Examiner* — Edward Zee
(74) *Attorney, Agent, or Firm* — Okamoto & Benedicto LLP

(57) ABSTRACT

Example embodiments relate to redirecting data packets. The examples disclosed herein receive a first packet from a first device. The first packet is qualified as a flow control packet. In response to the first packet being qualified as a flow control packet, examples herein then redirect the first packet from being delivered to a second device to being delivered to a third device.

9 Claims, 5 Drawing Sheets

REDIRECTING FLOW CONTROL PACKETS

CROSS-REFERENCE TO RELATED APPLICATION

This application is a continuation of International Application No. PCT/US2015/060518, with an International Filing Date of Nov. 13, 2015, which is incorporated herein by reference in its entirety.

BACKGROUND

Network security devices may protect computer networks from unwanted traffic. For example, a security appliance may identify malicious content in a data packet stream and take remedial action when malicious content is identified. Flow control is the process of managing the rate of data transmission between nodes to optimize data flow, such as by preventing faster senders from overwhelming slower receivers.

BRIEF DESCRIPTION OF THE DRAWINGS

The following detailed description references the drawings, wherein.

DETAILED DESCRIPTION

Figure 1:
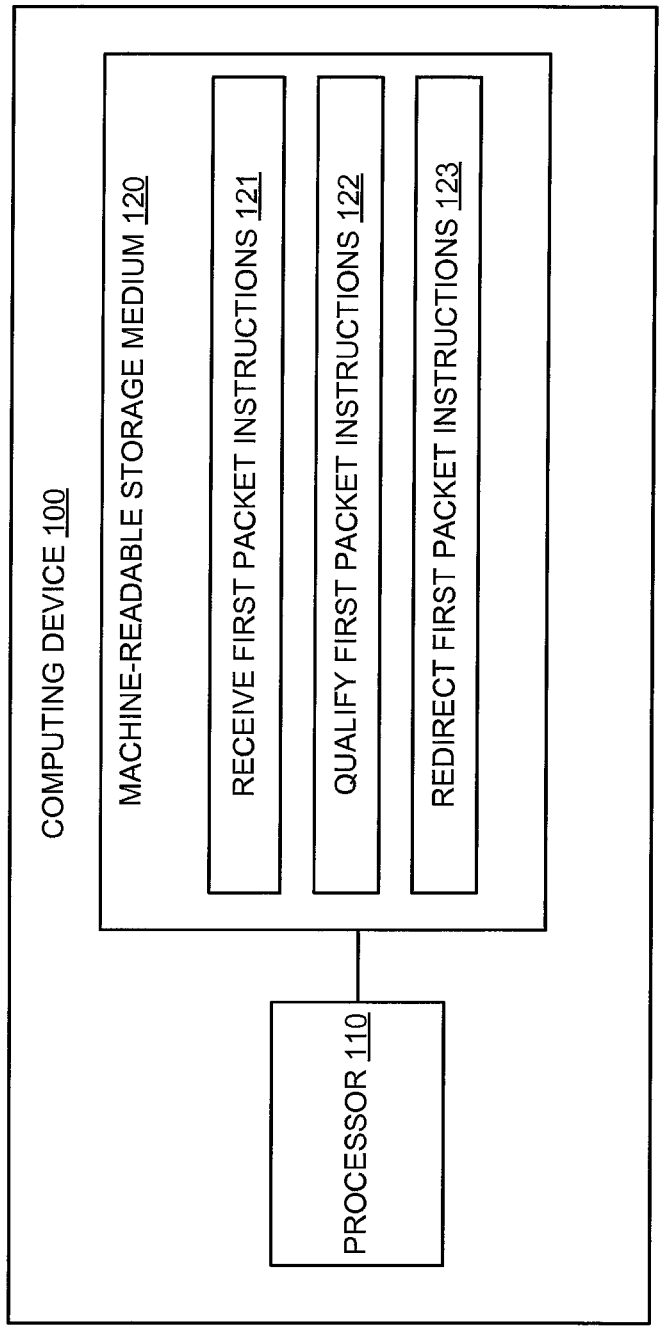
FIG. 1 is a block diagram of an example computing device for redirecting flow control packets.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

The amount of data that is generated, stored, and transmitted through computers and computing networks have explosively grown with the rapid expansion in the use of computers to host business applications, websites, cloud, etc. As more data is communicated, data protection has also increased in importance. Data protection measures can be placed within various nodes and interfaces in a computing network. For example, an intrusion protection system (IPS) may be placed in a networking switch between nodes to detect malicious content as data is communicated through the network.

However, current solutions do not effectively account for flow control mechanisms. For example, existing IPS solutions may drop or lose flow control packets sent from one device to another. As a result, an overwhelmed receiving device may not effectively communicate a flow control packet to a sending device if an IPS may obstruct the flow of the flow control packet.

Examples disclosed herein address these technical challenges by redirecting flow control packets from being delivered to one device, where the flow control packet may be lost, to being delivered to another device which may be a sending device. For example, an example network computing device may receive a first packet from a first device. The example computing device may then qualify the first packet as a flow control packet. If the first packet is qualified as a flow control packet, the computing device may then redirect the first packet from being delivered to a third device to being delivered to a second device. For example, the second device may be a sending device that sends data packets to the first device. When overwhelmed by excessive packets, the first device may send a flow control packet that may be redirected, by the example computing device, directly to the second device. In this manner, examples herein may alleviate data congestion and promote proper flow control.

Referring now to the drawings, FIG. 1 depicts an example computing device 100 for redirecting flow control packets. Computing device 100 may be, for example, a computing network device such as a gateway, a router, a switch, a bridge, a hub, a repeater, a modem, or other computing devices such as a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, computing device 100 includes a processor 110 and a non-transitory machine-readable storage medium 120 encoded with instructions to redirect flow control packets.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 121, 122, 123, and/or other instructions to implement the procedures described herein. As an alternative or in addition to retrieving and executing instructions, processor 110 may include one or more electronic circuits that include electronic components for performing the functionality of one or more of instructions 121, 122, and 123.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any electronic, magnetic, optical, or other physical storage device that contains or stores executable data accessible to computing device 100. Thus, machine-readable storage medium 120 may be, for example, a Random Access Memory (RAM), an Electrically Erasable Programmable Read-Only Memory (EEPROM), a storage device, an optical disc, and the like. Storage medium 120 may be a non-transitory storage medium, where the term "non-transitory" does not encompass transitory propagating signals. Storage medium 120 may be located in computing device 100 and/or in another device in communication with computing device 100. As described in detail below, machine-readable storage medium 120 may be encoded with receive first packet instructions 121, qualify first packet instructions 122, and redirect first packet instructions 123.

Receive first packet instructions 121, when executed by processor 110, may receive a first packet from a first device. A first device may be a computing device in a computing network. The first device may be any device that may send and/or receive data packets. Non-limiting examples of devices may include gateways, routers, switches, bridges, hubs, repeaters, servers, modems, and other computing devices.

A first packet may be a formatted unit of data to be carried by a packet-switched network. The first packet may be referred to as a data packet or network packet. A network packet, such as the first packet, may include control information and user data, which may be known as a payload. Control information may provide data for delivering the payload, for example, source and destination network addresses, error detection codes, and sequencing information. In some examples, control information may be included in packet headers and trailers. In some examples, a packet may only include control information.

In some examples, the first packet may be a flow control packet. Flow control may refer to the process of managing rates of data transmission between two nodes in a network to prevent a fast sender from overwhelming a slow receiver. Flow control may provide a mechanism for the receiver to control the transmission rate, so that the receiving node is not overwhelmed with data from the transmitting node. For example, the first packet may facilitate flow control in an Ethernet, or other networking protocol, computing network. In some examples, the first packet may be a PAUSE frame, as defined by the IEEE 802.3x standard. In another example, the first packet may be a priority-based flow control, as defined by the IEEE 802.1Qbb standard.

Qualify first packet instructions 122, when executed by processor 110, may qualify the first packet as a flow control packet. For example, qualify first packet instructions 122 may check whether the first packet is a flow control packet. In some examples, the first packet may be identified by control information. For example, the control information of the first packet may identify the first packet as a flow control packet. In such an example, processor 110 executing instructions 122 may qualify the first packet by reading the control information. It may not need to access any remaining data associated with the first packet.

In some examples, machine-readable storage medium 120 may further include instructions to match a network address of the first packet with a network address of the second device. Matching the network address of the first packet with the network address of the second device may confirm that the first packet is destined for the second device. For example, the network address of the first packet may be stored in the control information of the first packet, which may, in some examples, be included in the packet header or packet trailer.

In some examples, as an alternative to qualifying the first packet as a flow control packet, machine-readable storage medium 120 may include instructions to qualify whether the first packet meets a predetermined condition. Examples of predetermined conditions include whether first packet is a syn-ack message, an encrypted packet, or other qualifiers, or whether the first packet matches a network address, such as a MAC address or an IP address, of either the first device or second device. Other examples include the first packet's ethtype, VLAN values, and layer-4 protocols.

A network address may be an identifier for a node or network interface of a network. For example in an IEEE 802 network, such as a Ethernet or WiFi network, a media access control (MAC) address is a unique identifier assigned to network interfaces for communications on a physical network segment. In some examples, the first packet may include a media control access address that identifies that it is destined for the second device.

Redirect first packet instructions 123, when executed by processor 110, may redirect the first packet from being delivered to a third device to being delivered to a second device in response to the packet being qualified as a flow control packet. Like the first device, the second and third devices may each be a computing device in a computing network. The second and third devices may be any devices that may send and/or receive data packets. Non-limiting examples of devices may include gateways, routers, switches, bridges, hubs, repeaters, servers, modems, and other computing devices.

In response to the first packet being qualified as a flow control packet by execution of qualify first packet instructions 122, processor 110 may redirect the first packet to the second device. For example, the first packet may be shunted from its path towards the third device to a path directly to the second device. Details of this process is described in relation to the following figures.

In some examples, instead of redirecting the first packet, another action is taken on the first packet. Examples of other actions include dropping the packet or implementing an ingress and/or egress mirror.

Figure 2:
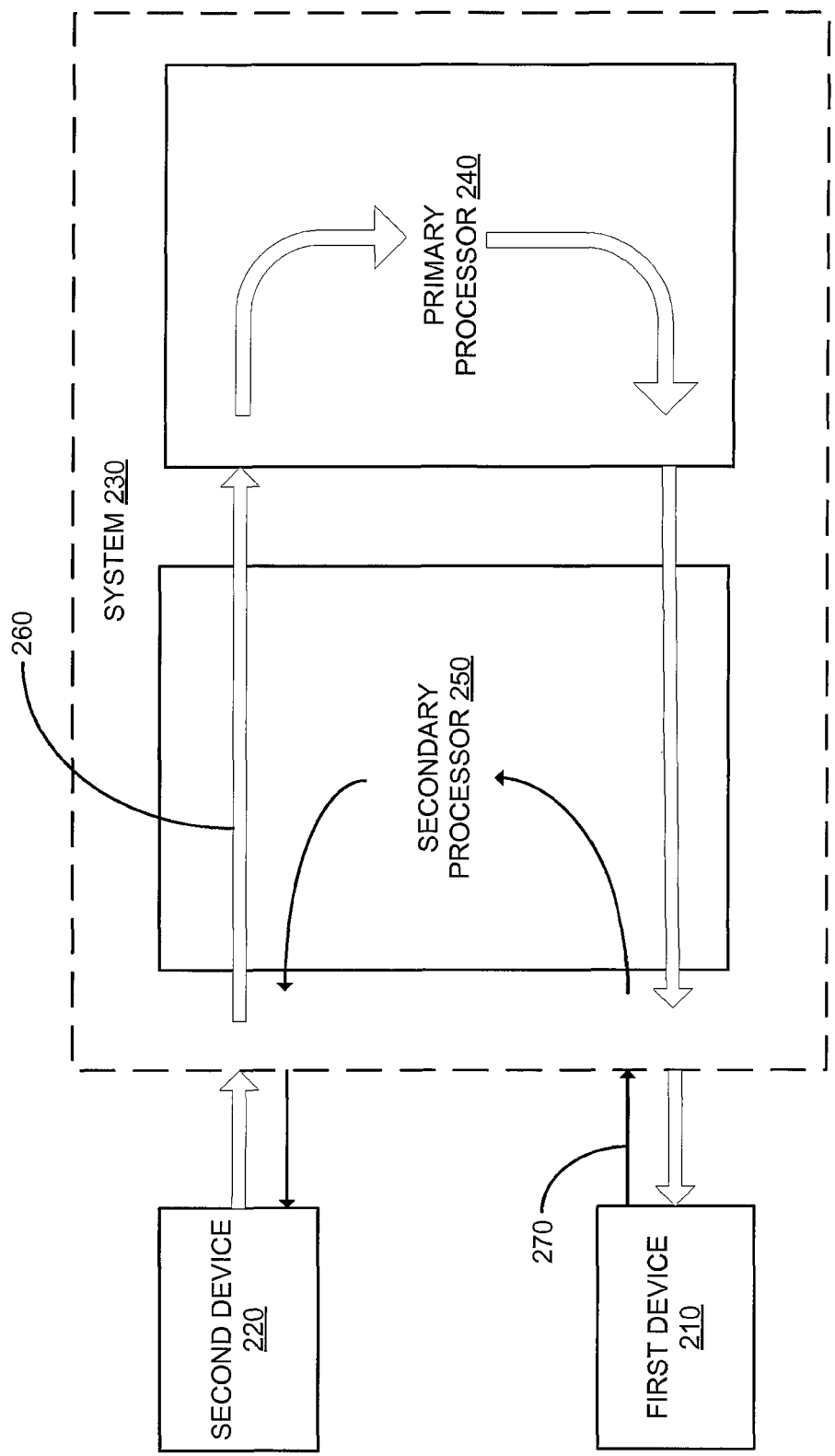
FIG. 2 is a schematic diagram of an example device for redirecting flow control packets between devices.

FIG. 2 is a schematic diagram of an example third device 230 for redirecting flow control packets between devices, such as first device 210 and second device 220. First device 210, second device 220, and primary processor 240 of system 230 may be analogous to the first device, second device, and third device described in relation to FIG. 1, and may be devices in a computing network such as gateways, routers, switches, bridges, hubs, repeaters, servers, modems, and other computing devices.

As depicted in FIG. 2, system 230 may have a primary processor 240 and a secondary processor 250. Primary processor 240 and secondary processor 250 may each be one or more central processing units (CPUs), semiconductor-based microprocessors, and/or other hardware devices suitable for retrieval and execution of instructions to implement the procedures described herein. As an alternative or in addition to retrieving and executing instructions, primary processor 240 and secondary processor 250 may each include one or more electronic circuits that include electronic components for performing the functionality described herein. Furthermore, in some examples, primary processor 240 and secondary processor 250 may not be separate devices but distinct components in a multi-component processor. Alternatively, primary processor 240 and secondary processor 250 may be components of separate devices, for example an intrusion prevention system and a networking switch, respectively.

In some examples, the second device 220 may be a sending device, where it sends second data packets 260 to be ultimately received by the first device 210. Second data packets 260 may be directed to the system 230 and may pass through primary processor 240. In a computing network, data packets may be sent between nodes via various forms of data link. For example, the devices may be connected via physical ports, connectors, and wires. Alternatively or in addition, the devices may communicate wirelessly, such as via WiFi.

In some examples, the system 230 may monitor the second data packets 260 for malicious content. For example, the system 230 may examine the incoming second data packets 260 to detect any data that may disrupt computer or network operations, gather sensitive information, or gain access to private computers or systems. System 230 may do so by the execution of instructions by primary processor 240.

Furthermore, system 230 may take a remedial action in response to identifying the malicious content in a packet in second data packets 260. For example, primary processor 240 may identify malicious activity, log information about this activity, attempt to stop it, and/or report it. In such a manner, system 230 may operate as an intrusion prevention or detection system. The second data packets 260 that pass the third device (i.e., the data packets that do not have identified malicious content) may then be directed to the first device 210.

In some instances, first device 210 may not be able to receive second data packets 260 at the rate in which the second data packets are sent from second device 220. In such instances, the first device 210 may be an overwhelmed network node. In some examples, first device 210 may send a first packet 270 to be received by second device 220. For example, the first packet 270 may be a flow control packet that will inform second device 220 that first packet 270 is overwhelmed by the second data packets 260 sent by the second device 220.

First packet 270 may be received by system 230. Secondary processor 250 may qualify the first packet 270 as a flow control packet. As described previously in relation to FIG. 1, secondary processor 250 may qualify the first packet 270 by its control information. For example, the packet header of first packet 270 may identify the first packet as a flow control packet. Without the secondary processor 250, in some existing solutions, first packet 270 may pass through primary processor 240, where the first packet may be dropped and never received by second device 220.

Furthermore, as described above, secondary processor 250 may also match a network address, such as a media control access address, of first packet 270 with a network address of first device 210. Matching the network address may confirm that first packet 270 originated from first device 210. For example, the network address may be stored in the control information of the first packet 270, which may, in some examples, be included in the packet header or packet trailer.

In response to qualifying the first packet 270 as a flow control packet, secondary processor 250 may redirect first packet 270 to the second device 220. For example, first packet 270 may be shunted from its path towards primary processor 240 to a path directly to the second device 220.

Upon receiving first packet 270 (i.e., the flow control packet), second device 220 may respond to the flow control request. For example, second device 220 may throttle its data rate. Furthermore, second device 220 may resend packets sent between the time first packet 270 originated from first device 210 and the time first packet 270 was received by second device 220. In such a manner, loss of packets sent between first device 210 and second device 220 may be alleviated.

Figure 3:
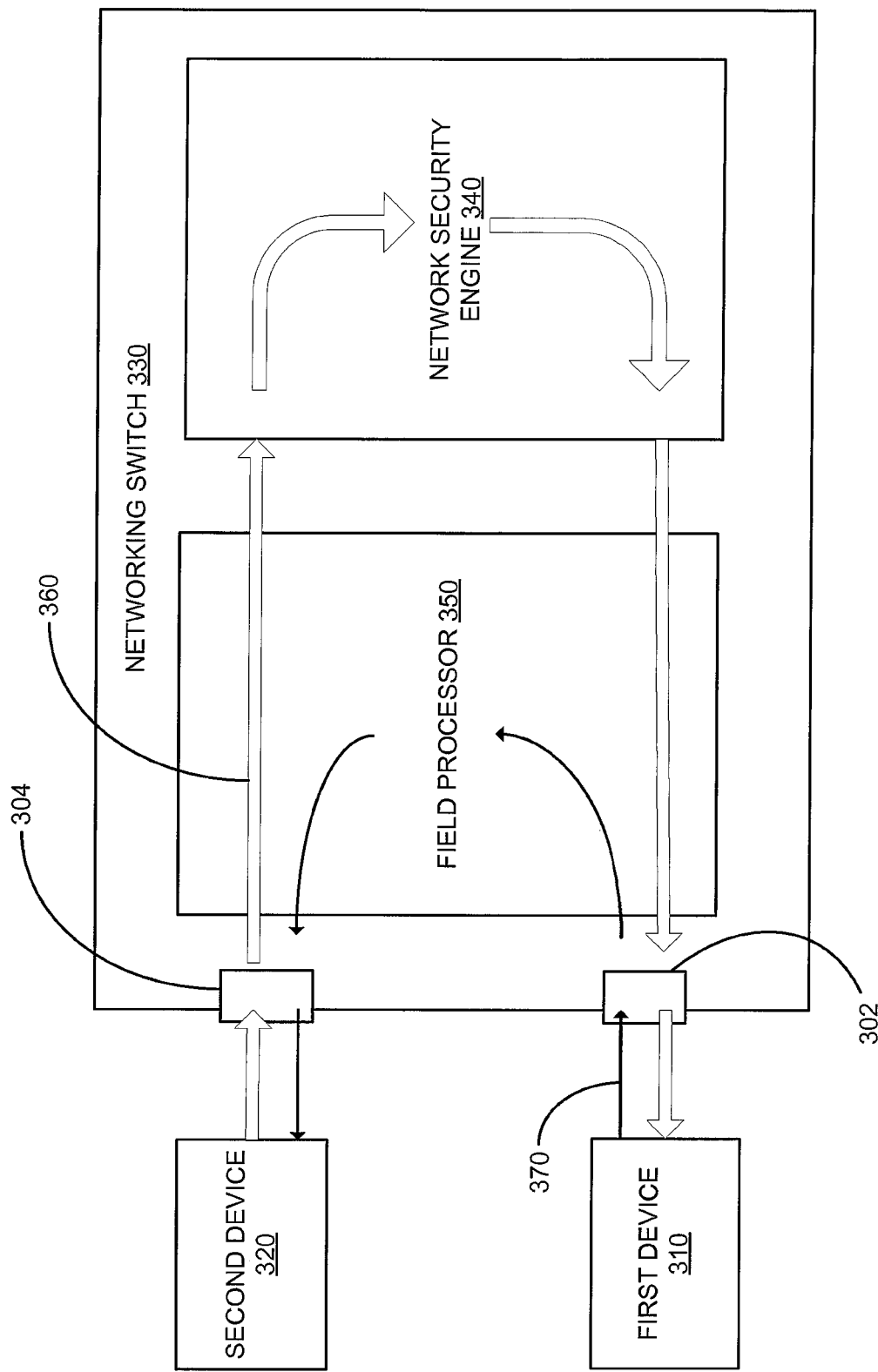
FIG. 3 is a schematic diagram of an example networking switch for redirecting flow control packets between devices.

FIG. 3 depicts an example networking switch 330 for redirecting flow control packets between devices. Networking switch 330 may be a computer networking device that connects devices together on a computer network, by using packet switching to receive, process and forward data to the destination device. In the example shown in FIG. 3, networking switch 330 may be connected in a computer network with first device 310 and second device 320. Networking switch 330 may be analogous to system 230 of FIG. 2, and first device 310 and second device 320 may be analogous to first device 210 and second device 220 of FIG. 2, respectively.

Networking switch may have a networking security engine 340 and a field processor 350. Network security engine 340 may include functionality similar to that executed by primary processor 240 as depicted in FIG. 2. Network security engine 340, in addition to each of the engines described herein, may generally represent a combination of hardware and programming. For example, the programming for network security engine 340 may be processor executable instructions stored on a non-transitory machine-readable storage medium, and the hardware for network security engine 340 may include at least one processor to execute those instructions. In addition or as an alternative, network security engine 340 may include one or more hardware devices including electronic circuitry for implementing the functionality described below.

Field processor 350 may be a separate processor for executing particular functionality. For example, field processor 350 may be a field-programmable gate array (FPGA) designed to implement the functionality described herein. In some examples, field processor 350 may include a number of engines, such as a network address matching engine, a packet qualifying engine, and a packet redirecting engine.

As similarly described above in relation to FIG. 2, second device 320 may send a plurality of data packets 360 to networking switch 330. Networking switch 330 may receive the plurality of data packets 360 at a second port 304, which may interface between second device 320 and networking switch 330, allowing for signal transfer between the devices. Second device 320 and networking switch 330 may be connected by various forms of data link. For example, the devices may be connected via physical ports, connectors, and wires connected to second port 304. Alternatively or in addition, the devices may communicate wirelessly, such as via WiFi.

In some examples, networking switch 330 may monitor the plurality of data packets 360 for malicious content. For example, network security engine 340 may examine the incoming plurality of data packets 360 to detect any data that may disrupt computer or network operations, gather sensitive information, or gain access to private computers or systems.

Furthermore, networking switch 330 may take a remedial action in response to identifying the malicious content. For example, network security engine 340 may identify malicious activity, log information about this activity, attempt to stop it, and/or report it. In such a manner, networking switching 330 may operate as an intrusion prevention or detection system. The data packets 360 that pass the network security engine 340 (i.e., the data packets that do not have identified malicious content) may then be directed to the first device 310 via a first port 302.

When first device 310 is overwhelmed by the plurality of data packets 360, first device 310 may send a first packet 370. Networking switch 330 may receive first packet 370, and the packet qualifying engine of field processor 350 may qualify the first packet 370 as a flow control packet. Furthermore, the network address matching engine of field processor 350 may match a network address, such as a media control access address, of first packet 370 with a network address of first device 310 to confirm that first packet 370 originated from first device 310.

In response to qualifying first packet 370 as a flow control packet and matching its network address, the packet redirecting engine of field processor 350 may redirect first packet 370 to the second device 320. For example, first packet 370 may be shunted from its path towards network security engine 340 to a path directly through second port 304 to the second device 320.

Upon receiving first packet 370 (i.e., the flow control packet), second device 320 may respond to the flow control directions. For example, second device 320 may throttle its data rate. Furthermore, second device 320 may resend packets sent between the time first packet 370 originated from first device 310 and the time first packet 370 was received by second device 320. In such a manner, loss of packets sent between first device 310 and second device 320 may be prevented.

Figure 4:
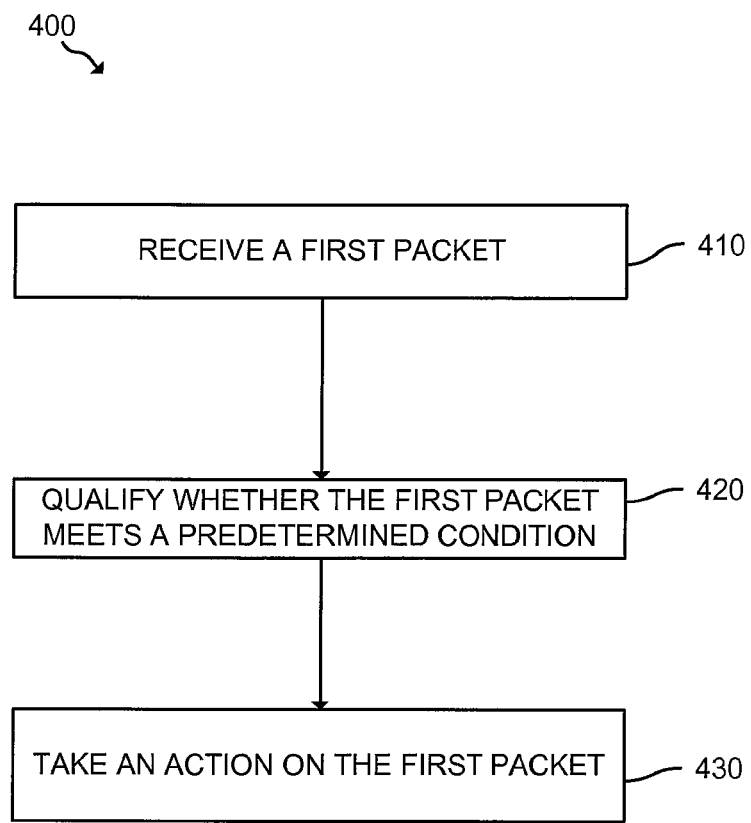
FIG. 4 is an example method for redirecting packets.

FIG. 4 depicts an example method 400 for redirecting packets. Although execution of method 400 is described below with reference to the examples illustrated in FIG. 3, other suitable devices for execution of this method should be apparent, including the examples of FIG. 1 and FIG. 2. Method 400 may be implemented in the form of executable instructions stored on a machine-readable storage medium and/or in the form of electronic circuitry.

In an operation 410, a first packet may be received. For example, an overwhelmed network receiving device, such as first device 310, may send a first packet 370 to be received by a networking sending device, such as second device 320. As described herein, the first packet may be a flow control packet. The first packet may be received by a networking switch 330 in operation 410, for example.

In an operation 420, the first packet may be qualified as to whether it meets a predetermined condition. For example, first packet 370 may be qualified as flow control packet. Alternatively or in addition, other predetermined conditions may be used to qualify first packet 370. Examples of other predetermined conditions include whether first packet is a syn-ack message, an encrypted packet, or other qualifiers, or whether the first packet 370 matches a network address, such as a MAC address or an IP address, of either the first device 310 or second device 320. Other examples include first packet 370's ethtype, VLAN values, and layer-4 protocols.

In response to the first packet meeting the predetermined condition, an action is taken on first packet 370 in an operation 430. For example, field processor 350 may redirect first packet 370 to the second device 320. For example, first packet 370 may be shunted from its path towards network security engine 340 to a path directly to the second device 320. Other examples of actions include dropping the packet or implementing an ingress and/or egress mirror.

Figure 5:
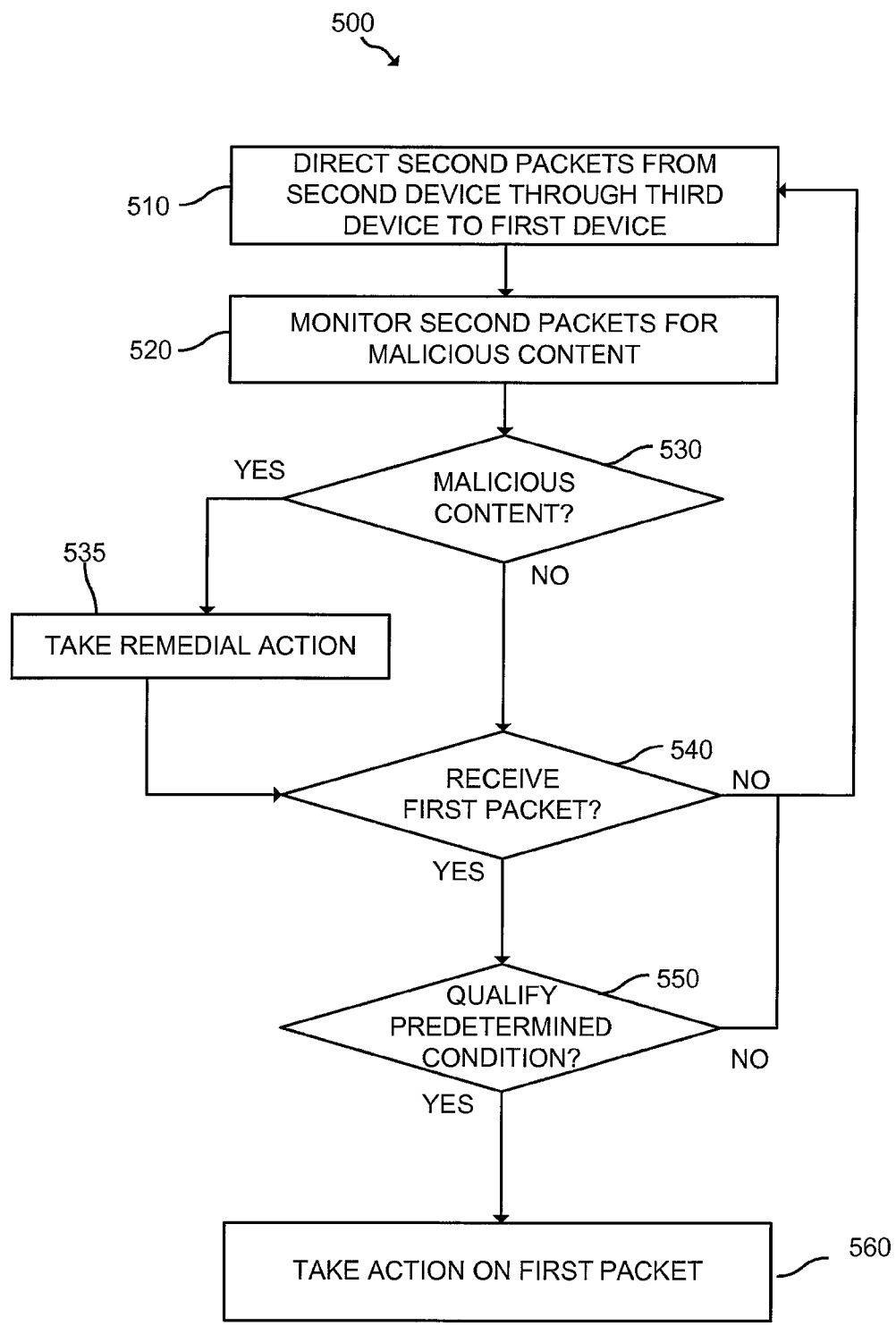
FIG. 5 is an example method for redirecting packets in response to packets qualifying predetermined conditions.

FIG. 5 depicts an example method 500 for redirecting packets in response to packets qualifying predetermined conditions. Although execution of method 500 is described below with reference to the examples illustrated in FIG. 3, other suitable devices for execution of this method should be apparent, including the examples of FIG. 1 and FIG. 2. Method 400 may be implemented in the form of executable instructions stored on a machine-readable storage medium and/or in the form of electronic circuitry.

In an operation 510, a second packet may be directed from a second device through a third device to a first device. For example, a data packet of plurality of data packets 360 may be sent from second device 320, directed through networking switch 330, and received at first device 310. In such an example, second device 320 is a sending node in the computing network, and first device 310 is the receiving node.

In an operation 520, the second packet may be monitored for malicious content. For example, network security engine 340 may examine the incoming data packets 360 to detect any data that may disrupt computer or network operations, gather sensitive information, or gain access to private computers or systems.

In an operation 530, network security engine 340 checks whether the data packet 360 has malicious content. Responsive to detecting malicious content, method 550 proceeds to an operation 535, where network security engine 340 may take a remedial action in response to identifying the malicious content. For example, network security engine 340 may identify malicious activity, log information about this activity, attempt to stop it, and/or report it. The data packets 360 that pass the network security engine 340 (i.e., the data packets that do not have identified malicious content) may then be directed to the first device 310.

In an operation 540, networking switch 330 checks whether a first packet 370 is received from first device 310. Responsive to receiving a first packet, method 500 may proceed to an operation 550, where networking switch 330 qualifies whether the first packet 370 meets a predetermined condition. For example, first packet 370 may be qualified as flow control packet. Alternatively or in addition, other predetermined conditions may be used to qualify first packet 370. Examples of other predetermined conditions include whether first packet is a syn-ack message, an encrypted packet, or other qualifiers, or whether the first packet 370 matches a network address, such as a MAC address or an IP address, of either the first device 310 or second device 320. Other examples include first packet 370's ethtype, VLAN values, and layer-4 protocols. In response the first packet meeting the predetermined condition, an action is taken on first packet 370 in an operation 560. For example, field processor 350 may redirect first packet 370 to the second device 320. For example, first packet 370 may be shunted from its path towards network security engine 340 to a path directly to the second device 320. Other examples of actions include dropping the packet or implementing an ingress and/or egress mirror.

While FIG. 5 shows method 500 as sequence of operations, in practice there may not be a sequence or order of the operations. FIG. 5 is merely to illustrate the operations. For example, operations 540 to 560 may be executed without the execution of the other operations and may be executed at any time a first packet is received.

The foregoing disclosure describes a number of example embodiments for redirecting flow control packets. The disclosed examples may include systems, devices, computer-readable storage media, and methods for redirecting flow control packets. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A non-transitory machine-readable storage medium encoded with instructions executable by a processor of a computing device, the non-transitory storage medium comprising instructions to:

receive a plurality of second packets that are transmitted by a second device over a computer network, wherein the plurality of second packets are inspected for malicious content at a third device;

receive a first packet from a first device that receives the plurality of second packets over the computer network;

qualify the first packet as a flow control packet based at least on control information in the first packet that indicates the first device is not able to receive the plurality of second packets at a rate the plurality of second packets are sent from the second device;

matching a network address of the first packet with a network address of the second device; and redirect the first packet from being delivered to the third device to being delivered to the second device in response to the first packet being qualified as the flow control packet, wherein the third device comprises a primary processor that is to inspect the plurality of second packets and identify malicious content in a packet in the plurality of second packets.

2. The non-transitory machine-readable storage medium of claim 1, wherein the third device further comprises a secondary processor that is to execute the instructions of the non-transitory machine-readable storage medium.

3. The non-transitory machine-readable storage medium of claim 1, wherein the third device is to take a remedial action in response to identifying malicious content in the packet in the plurality of second packets.

4. The non-transitory machine-readable storage medium of claim 1, wherein the instructions are to be executed by a field processor of a networking switch.

5. The non-transitory machine-readable storage medium of claim 1, wherein the first packet is one of a PAUSE frame packet or a priority-based flow control packet.

6. A networking switch, comprising:

a first port to receive a first packet sent by a first device over a computer network;

a second port to receive a plurality of second packets that are sent by a second device over the computer network;

a network security engine to monitor the plurality of second packets; and a field processor to:

match a network address of the first packet with a network address of the second device;

qualify the first packet as a flow control packet that indicates the first device is not able to receive the plurality of second packets at a rate the plurality of second packets are sent by the second device; and redirect the first packet from being delivered to the network security engine to being delivered to the second device via the second port in response to the first packet being qualified as the flow control packet, wherein the field processor is to direct the plurality of second packets to the network security engine; the network security engine is to monitor the plurality of second packets for malicious content and to take a remedial action in response to identifying malicious content in a packet in the plurality of second packets; and the field processor is to direct at least a portion of the plurality of second packets to the first port to be sent to the first device.

7. The networking switch of claim 6, wherein the first packet is one of a PAUSE frame packet or a priority-based flow control packet.

8. A method for execution by a computing device for redirecting packets, the method comprising:

receiving, on the computing device, a plurality of second packets sent by a second device over a computer network;

receiving, on the computing device, a first packet that is sent by a first device over the computer network;

qualifying, on the computing device, the first packet as a flow control packet that indicates the first device is not able to receive the plurality of second packets at a rate the plurality of second packets are sent by the second device;

redirecting, on the computing device, the first packet from being delivered to a third device to being delivered to the second device on the first packet in response to a network address of the first packet matching a network address of either the first device or the second device and in response to the first packet being qualified as the flow control packet; and monitoring, on the third device, the plurality of second packets for malicious content and to take a remedial action in response to identifying malicious content in a packet in the plurality of second packets.

9. The method of claim 8, further comprising directing, on the computing device, at least a portion of the plurality of second packets from the second device through the third device to the first device.

* * * * *

UNITED STATES PATENT AND TRADEMARK OFFICE
CERTIFICATE OF CORRECTION

PATENT NO. : 10,616,094 B2
APPLICATION NO. : 15/949882
DATED : April 7, 2020
INVENTOR(S) : Hendrie Page 1 of 1

It is certified that error appears in the above-identified patent and that said Letters Patent is hereby corrected as shown below:

In the Claims

Claim 8, Column 10, Line 38, after "the second device" and before "in response to a", delete "on the first packet"

Signed and Sealed this
Second Day of June, 2020

Andrei Iancu
*Director of the United States Patent and Trademark Office*